(12) United States Patent
Kuchler

(10) Patent No.: US 7,221,262 B2
(45) Date of Patent: May 22, 2007

(54) METHOD AND MONITORING DEVICE FOR MONITORING A WHEEL PARAMETER OF A WHEEL

(75) Inventor: Gregor Kuchler, Thalmassing (DE)

(73) Assignee: Siemens Aktiengesellschaft, München (DE)

( * ) Notice: Subject to any disclaimer, the term of this patent is extended or adjusted under 35 U.S.C. 154(b) by 251 days.

(21) Appl. No.: 11/069,000

(22) Filed: Mar. 1, 2005

(65) Prior Publication Data
US 2005/0190049 A1    Sep. 1, 2005

(30) Foreign Application Priority Data
Mar. 1, 2004   (DE) ...................... 10 2004 010 010

(51) Int. Cl.
*B60R 25/10* (2006.01)
(52) U.S. Cl. ................. 340/426.33; 340/442; 340/445; 73/146
(58) Field of Classification Search ........... 340/426.33, 340/442, 425.5, 438, 444, 445, 447; 73/146, 73/146.2, 146.4, 146.5
See application file for complete search history.

(56) References Cited

U.S. PATENT DOCUMENTS

| | | | | |
|---|---|---|---|---|
| 5,353,020 | A | * | 10/1994 | Schurmann ............ 340/870.31 |
| 5,741,966 | A | * | 4/1998 | Handfield et al. .......... 73/146.5 |
| 6,175,302 | B1 | | 1/2001 | Huang ........................ 340/442 |
| 6,604,416 | B2 | * | 8/2003 | Tsujita ....................... 73/146.5 |
| 6,690,271 | B2 | * | 2/2004 | Fischer et al. ............... 340/447 |
| 6,980,099 | B2 | * | 12/2005 | Kroitzsch et al. ........... 340/447 |
| 2003/0110851 | A1 | * | 6/2003 | Tsujita ........................ 73/146 |

FOREIGN PATENT DOCUMENTS

| | | |
|---|---|---|
| DE | 28 50 787 A1 | 6/1980 |
| JP | 11078446 | 3/1999 |

* cited by examiner

*Primary Examiner*—Toan N. Pham
(74) *Attorney, Agent, or Firm*—Laurence A. Greenberg; Werner H. Stemer; Ralph E. Locher

(57) ABSTRACT

A method for monitoring a wheel parameter of a wheel, in particular a vehicle wheel, by a monitoring device. The monitoring device contains a power supply having an energy converter for converting kinetic energy from the wheel into operating power for the wheel electronics, and a transmission unit for transmitting the wheel parameter to an evaluation unit.

19 Claims, 2 Drawing Sheets

METHOD AND MONITORING DEVICE FOR MONITORING A WHEEL PARAMETER OF A WHEEL

BACKGROUND OF THE INVENTION

FIELD OF THE INVENTION

The invention relates to a method and a device for monitoring a wheel parameter of a wheel. The monitoring device has a power supply with an energy converter for converting kinetic energy from the wheel into operating power for the wheel electronics, and a transmission unit for transmitting the wheel parameter to an evaluation unit.

Such methods and devices are known, particularly in monitoring systems for tire pressure in vehicles. In the tire pressure control systems, which transmit data unidirectionally from the wheel to the vehicle, it is absolutely essential for a "silent" monitoring device or wheel electronics system, i.e. one that is not transmitting due to a technical defect, to be detected reliably and as quickly as possible. If such a "silent" wheel electronics system is not detected and the driver is not notified of the system failure, then—in the absence of any warning—the driver might be misled into assuming that the tire pressure is normal, even though the actual tire pressure might have already fallen to a dangerous level.

In monitoring devices that are continuously powered by battery, their emission frequency—i.e. the frequency with which the wheel parameters are transmitted—is specified in their internal sequential program. This program is known to the receiver in the control system, so that the control system can alert the driver immediately if an expected transmission fails to arrive. The driver is therefore immediately able to assume control (manually) in the event of a potential defect in the wheel electronics system performing the monitoring function.

Such a monitoring device is mentioned in Japanese Patent Abstract JP 110 78 446 A, for example. In this device, a control unit contains a timing-based sequential program and the characteristic data of all monitoring devices used in the vehicle. If, at a predicted transmission time, the actual transmission signal fails to arrive at a certain monitoring device, the control unit sends out an alarm and alerts the driver to a potential fault. In this way a potential defect can be detected quickly and a potentially serious system failure reported.

In certain tire pressure control systems, however, the functioning of the wheel electronics system cannot be monitored in this way. In contrast to the previously mentioned monitoring devices, which draw their operating power from external power sources, for example batteries, the power supply in so-called generator-supplied monitoring devices comes from energy converters (generators), which—for example—convert the kinetic energy from the wheel into operating power for the wheel electronics system.

In such a control system, an evaluation unit—which is usually disposed on the vehicle on the outside of the wheels to be monitored—sporadically receives the wheel parameters detected by and transmitted from the monitoring devices arranged on the wheels as soon as sufficient power has been provided by the energy converter in the wheel. The wheel parameters thus obtained can then be logged in an evaluation unit, compared with target values, and further processed. For this purpose the evaluation unit has an input/output unit for data transfer, a storage unit for storing data and calculation algorithms, and a processing unit.

U.S. Pat. No. 6,175,302 B1 describes a tire pressure control system of this type. It contains a plurality of tire pressure gauges, which are installed in the tires of a vehicle and each of which forwards the detected pressure signal to a monitoring and evaluation unit. The operating power is obtained from energy converters, which convert the kinetic energy from the wheel into electrical current. The data from the sensors is transmitted wirelessly and after the operating power necessary for this purpose has been supplied by the energy converter.

An energy storage device is disposed downstream from the energy converter, to ensure a consistent power supply. Naturally the power supply available for signal transmission is limited despite the energy storage device. Therefore, in control systems of this type, it is not possible for the receiver to have an accurate prediction of when, or with what frequency, data will be transmitted from the wheel electronics system. Accordingly, the detection of silent wheel electronics systems is not possible by a simple time-out, i.e. by detecting failed transmissions.

Finally, published, non-prosecuted German patent application DE 28 50 787 A1 also discloses a method and device for monitoring a wheel of a vehicle by a monitoring device. The monitoring device has a power supply with an energy converter (for converting kinetic energy to electrical power), and, if necessary, an energy storage device, as well as a transmission device. The transmission of the signals to an evaluation device takes place as soon as the energy necessary for this purpose is provided by the power supply. This is a necessary requirement for operation of the transmission device. An alarm signal is emitted if, after a predefined period of time, the evaluation unit detects that signals are not being received from the monitoring units, or that the signals that are received are defective.

SUMMARY OF THE INVENTION

It is accordingly an object of the invention to provide a method and a monitoring device for monitoring a wheel parameter of a wheel which overcome the above-mentioned disadvantages of the prior art devices and methods of this general type, which enable silent monitoring devices or wheel electronics to be detected even though the power supply is dependent on data relating to driving dynamics.

With the foregoing and other objects in view there is provided, in accordance with the invention, a method for monitoring a wheel parameter of a wheel using a monitoring device. The monitoring device contains a power supply having an energy converter for converting kinetic energy from the wheel into operating power for wheel electronics, and a transmission unit for transmitting the wheel parameter to an evaluation unit. The method includes the steps of reading out and transmitting the wheel parameter to the evaluation unit at a transmission time, for which the power has been provided by the power supply. A predicted time of transmission is calculated in the evaluation unit with help from at least one dynamic performance parameter and a model of the power supply, the model being stored in a memory of the evaluation unit. The predicted time of transmission and an actual transmission time are compared and an alarm signal is emitted if a difference is detected between the predicted time of transmission and the actual transmission time or if an absence of a transmission is detected.

The method according to the invention thus has the following steps. The relevant wheel parameters—for example, tire pressure—are read out from the monitoring device, which is usually disposed on the wheel, and transmitted to the evaluation unit by a transmission unit. The data is only transmitted if the power necessary for this purpose has been provided by the power supply unit responsible for supplying operating power. A predicted transmission time is calculated in each case in the evaluation unit on the basis of at least one parameter relating to driving dynamics, and using a model of the power supply stored in the evaluation unit.

The dynamic performance parameters must not be transmitted by the wheel electronics system itself. In particular, they may also be obtained from sources external to the tires, such as ESP sensors, ABS sensors, or even tachometer data for example. By way of example, these parameters refer to vehicle speed, vehicle acceleration (as a differential of vehicle speed), cross acceleration, which can be detected—for example—by the ESP sensors, the ambient temperature, the inner tire pressure, the tire temperature, the wheel speed, the wheel load or even the road surface conditions, to name but a few.

In addition to the dynamic performance parameters, calculation of the predicted transmission times also requires a sufficiently accurate model of the power supply, the model being stored in a memory of the evaluation unit. The evaluation unit therefore contains a representative, functional relationship between the power output of the respective power supply unit and the respective dynamic performance parameters. On the basis of the data, it is possible to calculate accurately the predicted transmission times of the wheel parameters from the individual wheels or from the individual wheel electronics systems. The power required, for example in order to transmit the data by radio, is naturally also taken into account.

The predicted transmission times calculated in this way are then compared, within the evaluation unit, with the actual transmission times detected. If a (sufficiently large) difference is detected between the actual and the predicted transmission times, or if the absence of one or more transmissions is detected, this enables conclusions to be drawn concerning the functional status of the wheel electronics. Deviations from the predicted transmission times that were calculated suggest, for example, that there is a fault in the power supply to the wheel electronics and that total failure is imminent, while the absence of transmissions indicates that total failure has probably already occurred. In this case the evaluation unit may emit a corresponding alarm signal.

With regard to the issuing of alarms, the introduction of so-called tolerance periods for adjusting system accuracy is conceivable. Therefore, in the event of a delay relating to a predicted transmission time, an alarm signal is only emitted after one or more tolerance periods. If the transmission then takes place within the tolerance period, then the evaluation unit either refrains from emitting an alarm signal, or differentiates the alarm signal accordingly. Thus it is possible, for example, for the alarm signal to be emitted as a "warning" signal, since the difference between predicted and actual transmission time, as already mentioned above by way of example, indicates a potentially worn energy converter that might be about to break down completely.

In a further stage, it is possible—when the dynamic performance parameters are changed—to recalculate the respective predicted transmission times. If the vehicle speed is reduced, for example, the energy converters disposed in the tires supply less operating power, resulting in the next possible transmissions being delayed accordingly. In the method according to the invention, changes in the relevant dynamic performance parameters are registered and the predicted transmission times are recalculated.

One of the ways whereby this is possible is for the data received and detected by the evaluation unit to be logged. For this reason, the evaluation unit advantageously has a logging unit which stores all data—or only specified data—that is received and detected, or even forwards the data to an external data memory. The logging is preferably carried out separately for each wheel electronics system. The data logged includes, for example, the total number of absent transmissions since the start of the journey, the number of transmissions missed in direct succession, and/or the respective differences between actual and predicted transmission times.

A differentiated alarm signal may then be indicated to the driver by an alarm display unit. It is also conceivable, however, for certain alarm signals merely to be stored in a data storage unit, to enable the service center to analyze the error messages later in detail.

These differentiated alarm signals can be formed according to one or several criteria. These may be:
a) the last transmission missed,
b) the last n transmissions missed in sequence,
c) the total of m transmissions missed in the last t hours of operating time, or
d) the total of x transmissions received late in the last t hours of operating time.

On the basis of the above criteria a) to d), the following warnings might—for example—be displayed to the vehicle driver.

With regard to a): "Wheel currently no longer monitored", this has the advantage that warnings about potential faults in the wheel electronics for the corresponding wheel are issued as quickly as possible. With regard to b): "Wheel no longer monitored", this has the advantage that isolated transmission failures do not immediately result in a warning or even a fault warning.

With regard to c) and d), the message could read "Wheel monitoring unreliable".

This is advantageous in that preventive measures can be implemented on time if a cluster of transmission failures, or an increase in deviations of actual transmission times from predicted transmission times, is detected, which—as experience indeed shows—indicates the existence of a fault in the wheel electronics concerned. A combination of the criteria b), c) and d) also offers an advantageous possibility for combining the filtering out of isolated events that might result in a fault warning, and a method for the long-term monitoring and detection of unreliable transmission links or components.

It should be mentioned, rather in passing, that the alarm display unit may have an optical display module, for example an LCD or LED display, or even an audio or audiovisual display unit.

Preferably, the calculation algorithm for calculating predicted transmission times is adapted depending on a detected difference between actual and predicted transmission times. The adaptation of the calculation algorithm takes place within specified parameters. By feeding the difference between calculated predicted transmission times, and actual transmission times, back into the calculation algorithm, the latter is adapted to the specific wheel electronics system and thus the reliability of the monitoring is improved.

The adaptation within fixed, predefined parameter limits, serves to avoid a gradual loss of function in the wheel electronics, for example as a result of insidious deterioration in the energy converter or energy storage, radio efficiency, etc. The advantage of a method of this type is the secure and prompt detection of malfunctions in conjunction with an adaptation of the system in terms of an optimum and precise mode of operation.

Preferably, a parameter comparison value is formed which is defined by the comparison of at least one recently received dynamic performance parameter with at least one corresponding, previously received dynamic performance parameter. If this parameter comparison value exceeds a specified threshold value, the predicted transmission times (or just one predicted transmission time) are recalculated. If the parameter comparison value is below the specified threshold value, the predicted transmission times do not need to be recalculated. In this case, they may also be defined—if they have not already been calculated—by a simple interpolation of a single, previously calculated, predicted transmission time.

It should be mentioned that the transmission between the wheel electronics and the evaluation unit or alarm display unit may, of course, take place via hard wiring or wirelessly. The usual transmission methods and protocols known to a person skilled in the art may be used for this purpose. It is also possible, of course, for the evaluation unit to be disposed in the wheel if so required.

The features and advantages of the device according to the invention ensue mainly from the features and advantages of the method according to the invention.

It should also be noted that the invention incorporates the following components, according to the invention: a wheel electronics system, which is configured for the detection and monitoring of at least one wheel parameter of a wheel, in particular a vehicle wheel, a power supply, which contains an energy converter for converting kinetic energy from the wheel into operating power for the wheel electronics, and a transmission unit, which transmits the detected wheel parameters to an evaluation unit at defined transmission times (wired or wirelessly).

The evaluation unit has a processing unit, a data memory unit and an input/output unit. The processing unit is used for executing the necessary computing operations. The data memory unit is for storing the required calculation algorithms and for storing any available interim results, and the input/output unit is for communication with the peripheral units such as an alarm display unit, external sensors, etc.

The evaluation unit is configured for calculating at least one predicted transmission time of the wheel parameter according to the method explained above.

The power supply and/or the generator preferably have at least one energy storage device, as well as at least one energy converter. The energy storage device makes it possible, within defined limits, for power to be continuously supplied, since—for example—any surplus production, or underproduction, of power is buffered in the short term. The energy storage device is particularly important for the functioning of the wheel electronics, since it crucially affects the energy or voltage that can be provided to the wheel electronics. Even though the power comes from the energy converter component, its current status is likewise significantly affected by the storage properties of the energy storage device.

In particular, the following should also be taken into consideration: the capacity of the storage component, its automatic discharging capability, the temperature dependency of the two parameters, and any loading characteristic of the storage component depending on its current storage status and on the voltage level delivered by the energy converter or by any interposed charging stage. The power supplied by the generator in this extended sense thus depends on any existing residual voltage and on the integrated output voltage of the energy converter, modified with any loading characteristic of the storage element.

The evaluation unit advantageously has a time-related information unit, which is used in particular for determining information relating to actual transmission times. In addition, it enables any deviation between actual transmission time and predicted time of transmission to be registered. The corresponding time-related information could, however, also be obtained by time-related information units located in the sensors. The time-related information is accordingly fed into the respective transmission signal and read out in the evaluation unit.

The monitoring device according to the invention preferably has a logging unit for logging some or all of the data captured and calculated during the monitoring process. The logging unit may be disposed internally in the evaluation unit, or even connected to the evaluation unit via the input/output unit as an external memory unit. The advantage of the logging process, as already mentioned, is that differentiated alarm signals can be emitted depending on the gathered data. In addition, long-term monitoring and control is possible.

The evaluation unit is thus configured so that it emits alarm signals depending on the above-mentioned data. An alarm display device is provided for outputting or displaying an alarm. The device may be disposed inside the evaluation unit or even externally, whereby any possible known type of alarm display unit might be used (audio-acoustic, visual, etc.). It is also possible for the alarm signals to be saved in a data storage unit, for example to enable them to be interpreted and analyzed later by a service center. Such a data storage unit might be disposed internally or externally.

The evaluation unit is preferably configured such that it controls the output of a differentiated alarm signal depending on a quantity of absent transmissions and/or on any deviation between at least one predicted transmission time and at least one actual transmission time.

If the evaluation unit is configured, to advantageous effect, such that a parameter comparison value can be formed by the comparison of at least one recently received dynamic performance parameter with at least one corresponding, previously received parameter relating to driving dynamics, this makes it possible to predict expected transmission times while clearly saving on computing capacity.

It should be mentioned that the advantages, as described above, of the differentiated detection of malfunctions in wheel electronics can also be applied, of course, to wheel electronics in which the operating power is not generator-supported.

The invention therefore makes it possible, for the first time, to monitor wheel electronics that draw their operating power from energy converters or which are powered by generators. Furthermore, logging of the different messages makes it possible to achieve rapid yet robust warning of failures in the wheel electronics. It is now possible to emit differentiated alarm signals ranging from urgent warnings, through filtered warnings, to long-term warnings. One of the advantages of the invention, therefore, is that it increases the operational safety of a tire control system with generator-supplied wheel electronics: Malfunctions in this safety-related subsystem are detected quickly and reliably.

Other features which are considered as characteristic for the invention are set forth in the appended claims.

Although the invention is illustrated and described herein as embodied in a method and a monitoring device for monitoring a wheel parameter of a wheel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
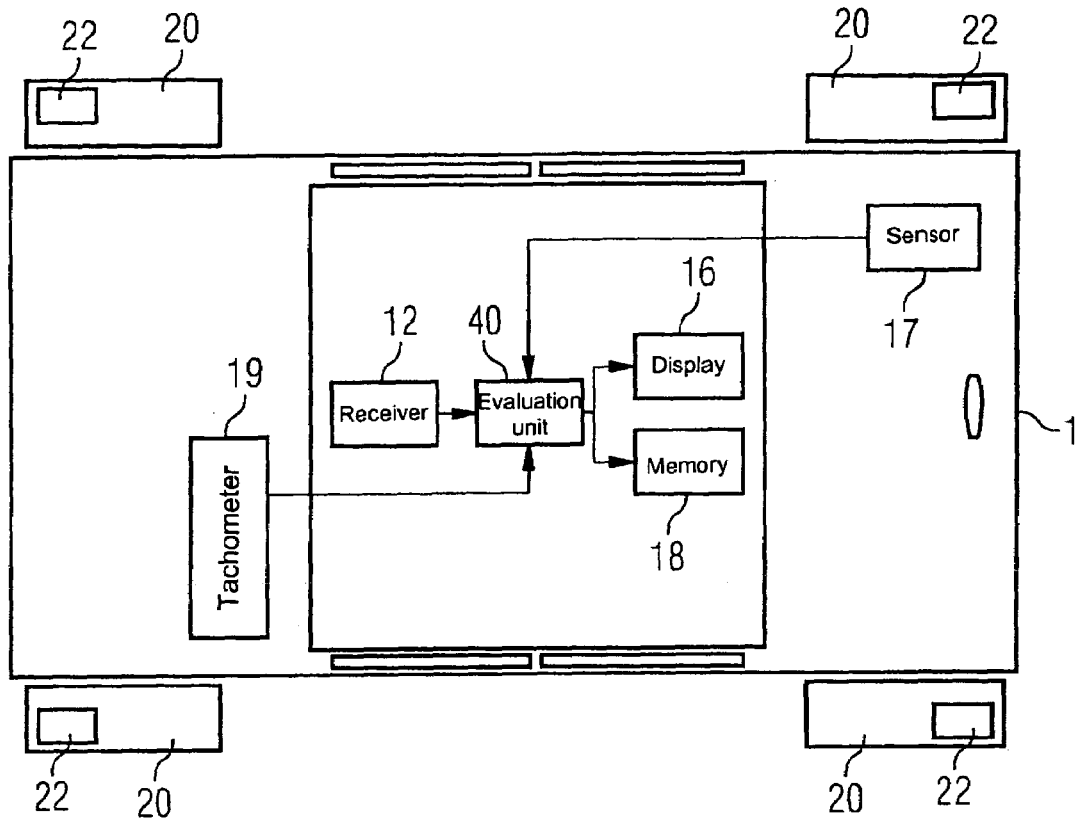
FIG. 1 is a schematic diagram of a vehicle having a monitoring device according to the invention, in a first exemplary embodiment.

In all the figures of the drawing, sub-features and integral parts that correspond to one another bear the same reference symbol in each case. Referring now to the figures of the drawing in detail and first, particularly, to FIG. 1 thereof, there is shown a schematic illustration of a vehicle 1 having a monitoring device, according to the invention, for monitoring wheel parameters 2. The vehicle 1 shown here incorporates four wheels 20, and therefore essentially corresponds to a conventional, known motor vehicle. Each of the four wheels 20 is equipped with a monitoring device or wheel electronics 22.

Figure 2:
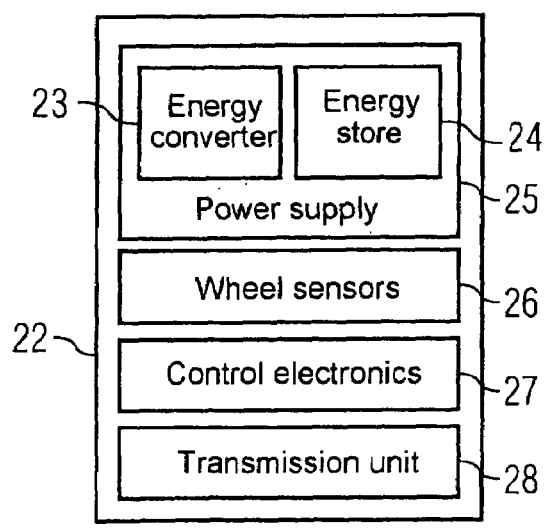
FIG. 2 is a schematic configuration of wheel electronics of the exemplary embodiment according to FIG. 1.

Each monitoring device 22 used here obtains its operating power from at least one energy converter 23, which converts the wheel movement into an electrical operating current (FIG. 2). To enable power to be supplied regularly, each energy converter 23 has an energy storage device 24 disposed downstream from it. Power is supplied for the detection and transmission of the corresponding wheel parameters 2 from the monitoring device 22 to a receiver unit 12, the receiver unit being disposed on the vehicle side in this case, whereby the power supply 25 varies over time depending on dynamic performance parameters 50, such as—for example—the vehicle speed, or unevenness of the road surface, etc.

The monitoring device 22 receives the relevant wheel parameters 2, such as—for example—tire pressure, tire temperature, or even tire load, by appropriate wheel sensors 26, and forwards the parameters, by a transmission unit 28, in this case containing radio electronics (see FIG. 2), to the receiver unit 12 in the vehicle. It is also possible, of course, for the detected wheel parameters 2 to be forwarded wired to the receiver unit 12.

The data is transferred from the receiver unit 12 to an evaluation unit 40, where it is processed further. This is where, as well as the data being stored in a memory unit 44 and/or processed further in the computing unit 42, the corresponding signal transmission times—the so-called actual transmission times 32—are detected by a time-related information unit 46 (see FIG. 3).

The vehicle 1 also has sensors and detectors 17, 19 disposed on it, which are used to record dynamic performance parameters 50. Thus, in this embodiment, the vehicle 1 contains a temperature sensor 17 and a tachometer unit 19. These two sensors 17, 19 transmit the ambient vehicle temperature and the vehicle speed to the evaluation unit 40. It should be mentioned at this point that the term "dynamic performance parameters" here also includes the ambient vehicle temperature, since this represents a relevant parameter for the purpose of energy extraction.

With the help of the dynamic performance parameters 50, and with the knowledge of a representative functional relationship between the parameters 50 and the power output of the power supply unit 25, the evaluation unit 40 is able to calculate predicted transmission times 30 for the corresponding monitoring device 22 and to compare the predicted transmission times 30 with the transmission times 32 actually detected in the time-related information unit 46.

If a comparison value 36 is then produced that exceeds a defined alarm threshold value, or if the respective transmissions are absent altogether, then the evaluation unit 40 emits an alarm signal to an alarm display unit 16 and or stores it in memory 18. It is also possible, of course, for the comparison values 36, or the different transmission times, etc., also to be read into the storage irrespective of the alarm threshold value, if so required for the purpose of continuous monitoring.

FIG. 2 is a schematic diagram showing the configuration of the monitoring device installed on the wheel side ("wheel electronics") 22. The wheel electronic system here contains four function groups.

First, there is a module for power supply 23, 24. The module 23, 24 containing the generator unit 23 and the energy storage unit 24 connected downstream from it. The generator (energy converter) 23 converts the kinetic energy from the wheel 20 into electrical power. To ensure that the power is distributed as regularly as possible, it is routed to the corresponding consumers 26, 27, 28 via the energy storage 24.

The wheel sensor group 26 contains the sensors necessary for detecting the corresponding wheel parameters 2 as required. As mentioned above, these may include temperature sensors, pressure sensors, etc.

By use of control electronics 27 that are likewise provided in the monitoring device 22, the activation of and recording by the sensors 26 is selectively controlled. In this exemplary embodiment, the detected wheel parameters 2 are transmitted by the transmission electronics 28, in this case containing radio electronics with antenna.

With the configuration of the monitoring device 22, it is clear that both the detection of the wheel parameters 2 and the transmission thereof to the evaluation unit 40 on the vehicle side is dependent both on the dynamic performance parameters 50 and on the functioning of the power supply module 23, 24. Therefore, for example, the energy converter 23 supplies a correspondingly high level of power at high vehicle speed, and the sensors 26 and the radio electronics 28 can capture and transmit data at very short intervals. As the vehicle speed is reduced, of course, the supply of power from the energy converter 23 decreases, which naturally results in that the transmission and detection intervals of the wheel sensors 26 and the transmission unit 28 also change.

The evaluation unit 40 is formed of the following at least: an input/output unit 48, which is used for the input and output of data between the evaluation unit 40 and the other components of the monitoring device, the computing unit 42 for calculating and evaluating data, the data memory unit 44 for storing calculation algorithms 49 and for buffering of data, and the time-related information unit 46 for obtaining time-related information.

Figure 3:
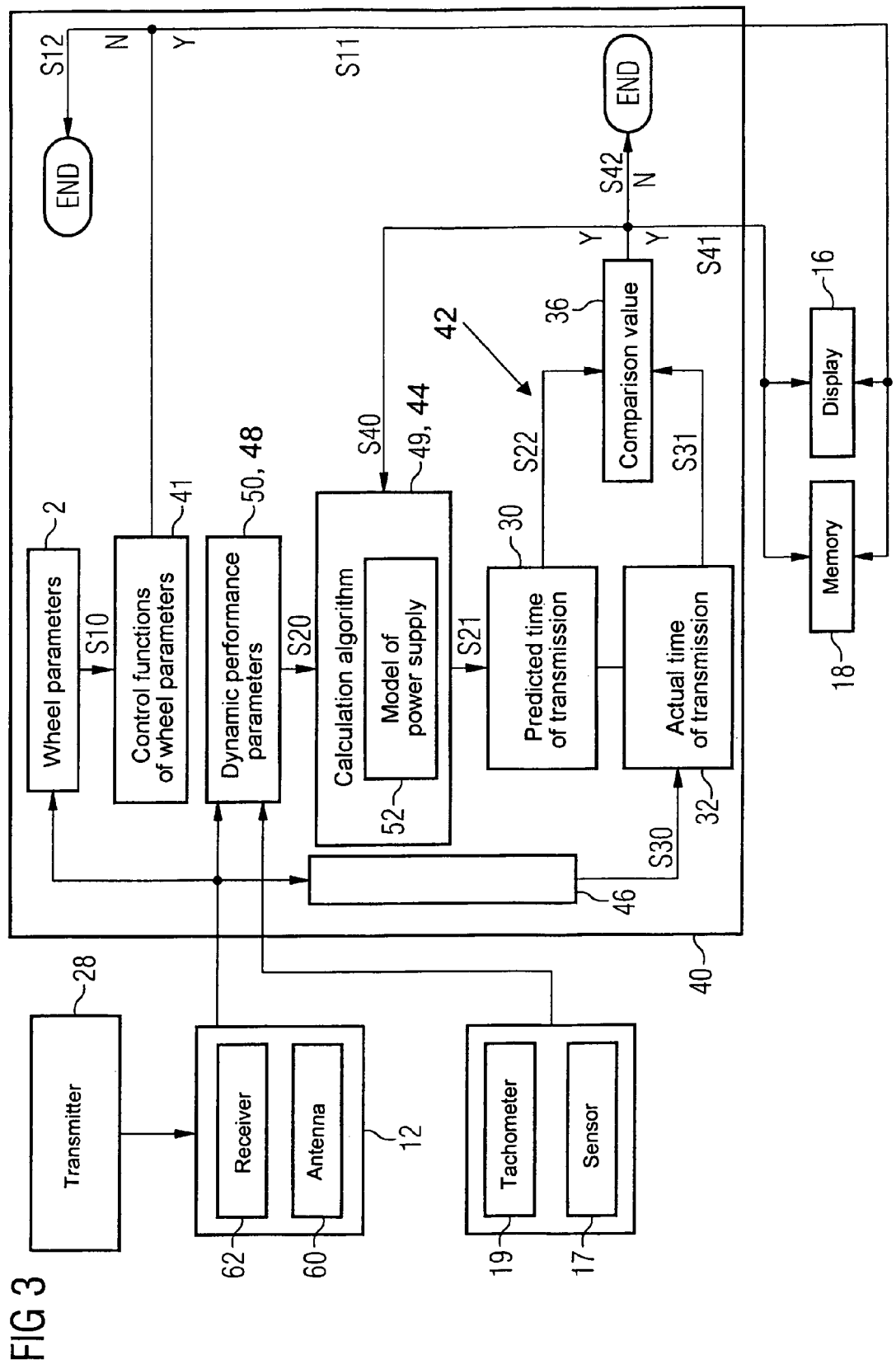
FIG. 3 is a block diagram of an evaluation unit and a receiving unit of the exemplary embodiment from FIG. 1.

FIG. 3 shows a schematic block diagram of the evaluation unit 40 and the receiver unit 12, as they appear in the vehicle in FIG. 1. The receiver unit 12 is formed of a receiver 60 and an antenna 62 for receiving the radio signals from the transmission unit 28 in the wheel. The signals received by the receiver unit 12 are then forwarded to the evaluation unit 40.

In addition, FIG. 3 illustrates how the data captured by the evaluation unit 40 is processed. First, the captured wheel parameters 2 are checked in the evaluation unit 40 with defined control functions 41, for example tire pressure control function or similar control functions (S10). In this case it is possible, for example, for the evaluation unit 40 to compare the wheel parameters 2 transmitted from the monitoring device 22 with the target parameters implemented in the evaluation unit 40, and to emit a corresponding alarm signal to the alarm display unit 16 and/or the memory unit 18 if any of the values are above or below the target values (S11). It is also possible, of course, for the data captured to be saved continuously in the memory unit 18 in order to carry out long-term monitoring.

Further information may also be derived from the receipt of the wheel parameters 2. Thus, for each receipt of a wheel parameter 2 transmitted from the monitoring device 22, the evaluation unit 40 detects the precise transmission time, otherwise known as the actual time of transmission 32, by the time-related information unit 46 (S30). The actual time of transmission 32 is then compared with a predicted transmission time 30 calculated in the evaluation unit 40 (S22 and S31). The comparison value 36 thus obtained makes it possible to draw conclusions concerning the functioning of the monitoring device 22, i.e. to establish whether the monitoring device 22 might be transmitting delayed signals, or not transmitting at all.

The predicted transmission time 30 is calculated in the evaluation unit 40 in the way described below.

Energy extraction for the tire monitoring device 22 according to the invention operates, as mentioned above, with the help of energy converters 23, which obtain the operating power for the detection and transmission of wheel parameters 2 from the kinetic energy of the corresponding wheel 20. As soon as sufficient power is available for the detection and transmission of the wheel parameters 2, the parameters are transmitted to the evaluation unit 40. The actual transmission times 32 are therefore dependent both on the parameters relating to driving dynamics 50, and also on the respective energy converter 23 or on the power supplied by the energy converter.

A model 52 of the power supply 25 or of the energy converter 23 is required in order to predict the expected transmission time 30 from each set of wheel electronics 22. The model 52 corresponds, for example, to an algorithm that enables the energy yield of the energy converter 23 to be calculated with sufficient accuracy. On the basis of the model 52 implemented in the evaluation unit 40, in conjunction with dynamic performance parameters 50, it is possible to calculate the predicted transmission times 30 of the respective wheel electronics 22 of all wheels 20 (S21).

Therefore, for example, the evaluation unit 40 receives both the vehicle speed and the engine speed from sensors controlled by driving dynamics, and, in conjunction with the model 52 of the power supply, calculates a predicted transmission time 30, i.e. the time at which a respective transmission may be expected.

If the corresponding transmission deviates from the expected transmission, or is absent altogether, then an alarm signal can be emitted which is sent either directly to the driver by the alarm signal unit 16, or to the memory unit 18 (S41).

By feeding (S40) the difference between the predicted transmission times, as calculated, and the actual transmission times 30, 32, back into the model 52 of the power supply for the monitoring device 22, the model being stored in the evaluation unit 40, the model can be improved and adapted for the specific monitoring device 22. Of course, the adaptation of the model 52 or of the calculation algorithm is only carried out within fixed, predefined parameter limits, to avoid any gradual loss of function in the monitoring device 22. This loss of function may be caused, for example, by insidious deterioration of the energy converter 23 or even in the radio efficiency.

To enable continuous monitoring to be carried out, in this exemplary embodiment all data relevant to operation is logged in the external memory unit 18. This is where, in addition to the wheel parameters and the alarm messages resulting from these (S11), the actual and predicted transmission times—as well as their comparison values 36—are stored (S50). It should be mentioned that it is also possible for the logging to be carried out in a logging unit configured inside the evaluation unit 40.

At this point it should be noted that all the components described above, individually and in any combination, and—in particular—the details shown in the drawings, are claimed as being essential to the invention. Modifications thereof are known to persons skilled in the art.

This application claims the priority, under 35 U.S.C. § 119, of German patent application No. 10 2004 010 010.1, filed Mar. 1, 2004; the entire disclosure of the prior application is herewith incorporated by reference.

I claim:

1. A method for monitoring a wheel parameter of a wheel using a monitoring device, the monitoring device containing a power supply having an energy converter for converting kinetic energy from the wheel into operating power for wheel electronics, and a transmission unit for transmitting the wheel parameter to an evaluation unit, which comprises the steps of:

reading out and transmitting the wheel parameter to the evaluation unit at a transmission time, for which the power has been provided by the power supply;

calculating a predicted time of transmission in the evaluation unit with help from at least one dynamic performance parameter and a model of the power supply, the model being stored in a memory of the evaluation unit;

comparing the predicted time of transmission and an actual transmission time; and emitting an alarm signal if a difference is detected between the predicted time of transmission and the actual transmission time or if an absence of a transmission is detected.

2. The method according to claim 1, which further comprises logging at least one of actual transmission times, predicted transmission times, dynamic performance parameters and further parameters that are taken into consideration.

3. The method according to claim 1, which further comprises logging a number of absent transmissions and/or the differences between the predicted time of transmission and the actual transmission time.

4. The method according to claim 1, which further comprises emitting different alarm signals depending on a quantity of absent transmissions and/or on any deviation between the predicted time of transmission and the actual transmission time.

5. The method according to claim 1, which further comprises:
adapting a calculation algorithm for calculating predicted transmission times in dependence on at least one difference between the predicted time of transmission and the actual transmission time; and
carrying out the adapting step within specified parameter limits.

6. The method according to claim 1, which further comprises:
comparing the at least one dynamic performance parameter that has been received, to a corresponding, last received dynamic performance parameter, and a recalculation of at least a next predicted time of transmission takes place only if a corresponding threshold value is exceeded.

7. The method according to claim 1, which further comprises displaying the alarm signal to a driver via an alarm signal unit and/or storing the alarm signal in memory.

8. The method according to claim 1, which further comprises monitoring the wheel parameter of a vehicle wheel.

9. A monitoring system for monitoring a wheel parameter of a wheel, the monitoring system comprising:
an evaluation unit; and
a monitoring device, containing:
a power supply having an energy converter for converting kinetic energy from the wheel into operating power for said monitoring device; and
a transmission unit for transmitting the wheel parameter to said evaluation unit at defined transmission times;
said evaluation unit having a computing unit, a data memory and an input/output unit, said evaluation unit being programmed to:
calculate at least one predicted time of transmission of the wheel parameter on a basis of at least one dynamic performance parameter and a model of said power supply, the model being stored in said data memory;
compare the predicted time of transmission with at least one actual transmission time, such that a comparison value thus obtained allows conclusions to be drawn concerning a functional status of said monitoring device; and
emit an alarm signal in response to a comparison result.

10. The monitoring system according to claim 9, wherein said power supply has at least one energy storage device for intermediate storage of the power delivered by said energy converter.

11. The monitoring system according to claim 9, wherein said evaluation unit has a time-related information unit for determining time-related information of actual transmission times and differences in time between the actual transmission times and predicted transmission times.

12. The monitoring system according to claim 9, further comprising a logging unit for logging of actual transmission times, predicted transmission times and/or captured parameters relating to driving dynamics.

13. The monitoring system according to claim 9, wherein said evaluation unit is configured for emitting the alarm signal if one and/or more transmissions are absent and/or if a difference is detected between the actual transmission time and the predicted time of transmission and any tolerance periods.

14. The monitoring system according to claim 13, further comprising:
an alarm signal unit for emitting the alarm signal, said alarm signal unit connected to said evaluation unit; and
a memory for storing the alarm signal, said memory connected to said evaluation unit.

15. The monitoring system according to claim 9, wherein said evaluation unit is configured such that it emits different alarm signals depending on a quantity of absent transmissions and/or on an amount of deviation between the predicted time of transmission and the actual transmission time.

16. The monitoring system according to claim 9, wherein said evaluation unit is configured such that a calculation algorithm for calculating predicted transmission times is adapted depending on at least one difference between the predicted time of transmission and the actual transmission time.

17. The monitoring system according to claim 9, wherein said transmission unit is a unit for wireless transmission.

18. The monitoring system according to claim 9, wherein said evaluation unit contains:
a threshold value discriminator having an output outputting a threshold value discriminator value;
a comparison unit for forming a parameter comparison value by a comparison of at least one recently received dynamic performance parameter with at least one corresponding, previously received dynamic performance parameter and the threshold value discriminator value; and
a sequence control system connected to said output of said threshold value discriminator and precisely recalculating at least one predicted time of transmission, if the parameter comparison value exceeds a specified threshold.

19. The monitoring system according to claim 9, wherein said monitoring device monitors the wheel parameter of a vehicle wheel.

* * * * *